(12) United States Patent
Chen (10) Patent No.: US 12,097,853 B2
(45) Date of Patent: Sep. 24, 2024

(54) METHOD AND APPARATUS FOR DETERMINING VEHICLE SPEED CONTROL MODEL TRAINING SAMPLE

(71) Applicant: Momenta (Suzhou) Technology Co., Ltd., Suzhou (CN)

(72) Inventor: Yu Chen, Suzhou (CN)

(73) Assignee: Momenta (Suzhou) Technology Co., Ltd., Suzhou (CN)

( * ) Notice: Subject to any disclaimer, the term of this patent is extended or adjusted under 35 U.S.C. 154(b) by 203 days.

(21) Appl. No.: 17/881,748

(22) Filed: Aug. 5, 2022

(65) Prior Publication Data
US 2022/0371587 A1     Nov. 24, 2022

Related U.S. Application Data

(63) Continuation of application No. PCT/CN2022/095101, filed on May 26, 2022.

(30) Foreign Application Priority Data

Apr. 13, 2022    (CN) .......................... 202210384249.1

(51) Int. Cl.
| | |
|---|---|
| B60W 30/14 | (2006.01) |
| B60W 50/00 | (2006.01) |
| G06N 20/00 | (2019.01) |

(52) U.S. Cl.
CPC .......... *B60W 30/146* (2013.01); *G06N 20/00* (2019.01); *B60W 2552/05* (2020.02); *B60W 2552/10* (2020.02); *B60W 2552/15* (2020.02); *B60W 2552/30* (2020.02); *B60W 2556/35* (2020.02); *B60W 2720/10* (2013.01)

(58) Field of Classification Search
CPC ... B60W 30/143; B60W 30/146; B60W 50/00
See application file for complete search history.

(56) References Cited

U.S. PATENT DOCUMENTS

| | | | |
|---|---|---|---|
| 2013/0253797 A1 | 9/2013 | McNew | |
| 2017/0305349 A1* | 10/2017 | Naboulsi | ................ B60R 1/025 |

(Continued)

FOREIGN PATENT DOCUMENTS

| | | |
|---|---|---|
| CN | 109686086 A | 4/2019 |
| CN | 110576849 A | 12/2019 |

(Continued)

*Primary Examiner* — Long T Tran (57) ABSTRACT

Disclosed in the present disclosure are a method and an apparatus for determining a vehicle speed control model training sample. The method includes: a lane in map data is divided into a first lane area and a second lane area, and to-be-measured vehicle speed control features indicated by the two lane areas are different; the to-be-measured vehicle speed control features are determined as target vehicle speed control feature when a difference between a first empirical highest vehicle speed distribution and a second empirical highest vehicle speed distribution is greater than or equal to a preset difference threshold; and starting coordinates and ending coordinates of each preset lane section in the map data, and the target vehicle speed control features and a vehicle speed control label in the preset lane section are taken as a vehicle speed control model training sample.

20 Claims, 5 Drawing Sheets

Divide a lane in map data into a first lane area and a second lane area — S110

Determine the to-be-measured vehicle speed control features as target vehicle speed control features when a difference between a first empirical highest vehicle speed distribution and a second empirical highest vehicle speed distribution is greater than or equal to a preset difference threshold — S120

Take starting coordinates and ending coordinates of each preset lane section in the map data, and the target vehicle speed control features and a vehicle speed control label in the preset lane section as a vehicle speed control model training sample — S130

(56) References Cited

U.S. PATENT DOCUMENTS

| | | | |
|---|---|---|---|
| 2017/0364083 A1* | 12/2017 | Yang | G05D 1/0223 |
| 2020/0192390 A1* | 6/2020 | Luo | G05D 1/0221 |
| 2020/0219388 A1* | 7/2020 | Liu | G08G 1/0112 |
| 2020/0312155 A1* | 10/2020 | Kelkar | B60W 60/005 |
| 2020/0342756 A1* | 10/2020 | MacKenzie | B60W 50/0098 |
| 2021/0043103 A1* | 2/2021 | Urano | G09B 9/052 |
| 2021/0061272 A1* | 3/2021 | Kawanai | B60W 30/09 |
| 2021/0229708 A1* | 7/2021 | Kondo | B60W 60/001 |
| 2021/0272018 A1* | 9/2021 | Casas | G05D 1/0088 |

FOREIGN PATENT DOCUMENTS

| | | |
|---|---|---|
| CN | 110861650 A | 3/2020 |
| CN | 111238517 A | 6/2020 |
| CN | 111376912 A | 7/2020 |
| CN | 112863180 A | 5/2021 |
| CN | 113554877 A | 10/2021 |
| CN | 114454878 A | 5/2022 |
| CN | 114627649 A | 6/2022 |
| DE | 19848236 A1 | 4/2000 |

\* cited by examiner

METHOD AND APPARATUS FOR DETERMINING VEHICLE SPEED CONTROL MODEL TRAINING SAMPLE

CROSS-REFERENCE TO RELATED APPLICATIONS

This application is a continuation of International Application No. PCT/CN2022/095101, filed on May 26, 2022, which claims priority to Chinese Patent Application No. 202210384249.1, filed on Apr. 13, 2022. The disclosures of the aforementioned applications are hereby incorporated by reference in their entireties.

TECHNICAL FIELD

The present disclosure relates to the technical field of automobiles, and in particular to a method and an apparatus for determining a vehicle speed control model training sample.

BACKGROUND

During the operating process of a vehicle, traffic accidents may be caused by an excessively high speed of the vehicle, while traffic jam may be caused by difficulty in running of following vehicles due to extra-low speed of the vehicle. Therefore, an appropriate speed of the vehicle can improve the smoothness of traffic while ensuring the safety of traffic. However, at present, the speed of the vehicle is adjusted mainly according to the driving experience of a driver and/or the road conditions around the vehicles, and it is difficult to control the vehicles on the whole road network to run on the road section with the appropriate speed.

In summary, how to automatically and effectively control the vehicles is an urgent problem that needs to be solved at present.

SUMMARY

The present disclosure provides a method and an apparatus for determining a vehicle speed control model training sample, which can solve the problem that traffic accidents and traffic jam are easily caused because vehicles cannot be automatically controlled to run at an appropriate speed.

The specific technical solutions of the present disclosure are as follows.

In a first aspect, the embodiments of the present disclosure provide a method for determining a vehicle speed control model training sample, the method including:

dividing a lane in map data into a first lane area and a second lane area, where to-be-measured vehicle speed control features indicated by the first lane area and the second lane area are different;

determining the to-be-measured vehicle speed control features as target vehicle speed control feature when a difference between a first empirical highest vehicle speed distribution and a second empirical highest vehicle speed distribution is greater than or equal to a preset difference threshold, where the first empirical highest vehicle speed distribution includes a plurality of empirical highest vehicle speeds of a plurality of vehicles in the operating process of the first lane area, and the second empirical highest vehicle speed distribution includes a plurality of empirical highest vehicle speeds of the plurality of vehicles in the operating process of the second lane area; and taking the starting coordinates and ending coordinates of each preset lane section in the map data, and the target vehicle speed control features and a vehicle speed control label in the preset lane section as a vehicle speed control model training sample, where the vehicle speed control label is a label of target vehicle speed obtained according to empirical speed statistics.

According to the above technical solution, compared with the related technology that the speed of the vehicle is adjusted according to the driving experience of a driver and/or the road conditions around the vehicle, in the embodiment of the present disclosure, the target vehicle speed control features influencing the speed of the vehicle can be firstly mined through the difference of the empirical highest vehicle speed distribution of the two lane areas divided on the basis of the to-be-measured vehicle speed control features, and then the starting coordinates and ending coordinates of each preset lane section in the map data, and the target vehicle speed control features and the vehicle speed control label in the preset lane section are taken as the vehicle speed control model training sample, so as to train a vehicle speed control model for controlling the speed of the vehicle on the basis of the vehicle speed control model training sample, thereby not only automatically determining the vehicle speed control model training sample, but also automatically providing the vehicles with the appropriate target vehicle speed on the basis of the vehicle speed control model generated by the vehicle speed control model training sample, therefore, the whole road network can run at an appropriate speed, and the smoothness of traffic is improved when the safety of traffic is ensured.

In a first possible implementation mode of the first aspect, the determining the to-be-measured vehicle speed control features as target vehicle speed control features when a difference between a first empirical highest vehicle speed distribution and a second empirical highest vehicle speed distribution is greater than or equal to a preset difference threshold includes:

generating a first highest vehicle speed histogram and a second highest vehicle speed histogram respectively according to the empirical highest vehicle speeds corresponding to the first lane area and the second lane area; and determining the to-be-measured vehicle speed control features as the target vehicle speed control features when a difference between the first empirical highest vehicle speed distribution represented by the first highest vehicle speed histogram and the second empirical highest vehicle speed distribution represented by the second highest vehicle speed histogram is greater than or equal to a preset difference threshold.

In a second possible implementation mode of the first aspect, before starting coordinates and ending coordinates of each preset lane section in the map data, and the target vehicle speed control features and a vehicle speed control label in the preset lane section are taken as a vehicle speed control model training sample, the method further includes:

for each to-be-counted preset lane section, fitting a plurality of empirical speeds on the to-be-counted preset lane section on the basis of a Gaussian mixture model to obtain empirical speeds of a plurality of speed grades, where the speed grades and the empirical speeds are in a positive correlation relationship; and taking the average value of the empirical speeds of the highest speed grade as a target vehicle speed of the to-be-counted preset lane section, and a vehicle speed control label containing target vehicle speed is generated.

According to the above technical solution, in the embodiment of the present disclosure, when the vehicle speed control label containing the target vehicle speed is generated, the empirical speeds of the highest speed grade can be summarized from a large number of empirical speeds, and the average value of the empirical speeds of the highest speed grade is taken as the target vehicle speed of the corresponding preset lane section, so that the target vehicle speed can be determined on the basis of most high-speed vehicles, and therefore, the target vehicle speed predicted subsequently on the basis of the vehicle speed control model can further ensure the safety of traffic while improving the smoothness.

In a third possible implementation mode of the first aspect, before the starting coordinates and ending coordinates of each preset lane section in the map data, and the target vehicle speed control features and a vehicle speed control label in the preset lane section are taken as a vehicle speed control model training sample, the method further includes:

deleting abnormal data in the plurality of empirical speeds corresponding to each preset lane section.

According to the above technical solution, in the embodiment of the present disclosure, the vehicle speed control model is not interfered by abnormal data during training by deleting the abnormal empirical speeds, so that the prediction precision of the vehicle speed control model is improved.

In a fourth possible implementation mode of the first aspect, the abnormal data includes at least one of the following:

empirical speeds smaller than or equal to a preset speed threshold on a high-speed road section;

empirical speeds on a preset lane road section with an empirical speed number smaller than or equal to a preset number threshold; and empirical speeds on adjacent two road points with an empirical speed difference greater than or equal to a preset speed difference threshold.

In a fifth possible implementation mode of the first aspect, after the starting coordinates and ending coordinates of each preset lane section in the map data, and the target vehicle speed control features and a vehicle speed control label in the preset lane section are taken as a vehicle speed control model training sample, the method further includes:

scaling a first preset lane section and a vehicle speed control label corresponding to the first preset lane section are scaled in equal proportion, and taking the starting coordinates and ending coordinates of the scaled first preset lane section, the target vehicle speed control features corresponding to the scaled first preset lane section and a vehicle speed control label corresponding to the scaled first preset lane section as a vehicle speed control model training sample, where the first preset lane section is a preset lane section for scaling; and/or, rotating a second preset lane section, and taking the starting coordinates and ending coordinates of the rotated second preset lane section, the target vehicle speed control features corresponding to the rotated second preset lane section and a vehicle speed control label corresponding to the rotated second preset lane section as a vehicle speed control model training sample, where the second preset lane section is a preset lane section for rotating.

According to the above technical solution, in the embodiment of the present disclosure, by scaling and/or rotating the original vehicle speed control model training sample, the vehicle speed control model training sample with more scenes can be obtained, therefore, the vehicle speed control model can learn training set data with better generalization ability, and further, the prediction precision of the vehicle speed control model is improved.

In a sixth possible implementation mode of the first aspect, the to-be-measured vehicle speed control features include at least one of the following:

road curvature, turning left at an intersection, turning right at an intersection, running straight at an intersection, a ramp, a merging lane and a diverging lane.

In a seventh possible implementation mode of the first aspect, when the to-be-measured vehicle speed control features include the road curvature, the dividing a lane in the map data into a first lane area and a second lane area includes:

dividing the lane in the map data into the first lane area meeting a first road curvature range and the second lane area meeting a second road curvature range.

In an eighth possible implementation mode of the first aspect, before the lane in the map data is divided into the first lane area meeting a first road curvature range and the second lane area meeting a second road curvature range, the method further includes:

carrying out curve fitting on coordinates of road points in the map data to obtain the road curvature.

In a ninth possible implementation mode of the first aspect, when the to-be-measured vehicle speed control features include any one of the turning left at an intersection, the turning right at an intersection, the running straight at an intersection, the ramp, the merging lane and the diverging lane, the dividing the lane in the map data into the first lane area and the second lane area includes:

dividing the lane in the map data into the first lane area with the to-be-measured vehicle speed control features and the second lane area without the to-be-measured vehicle speed control features.

In a second aspect, the embodiments of the present disclosure provide an apparatus for determining a vehicle speed control model training sample, the apparatus including:

a dividing unit, configured to divide a lane in map data into a first lane area and a second lane area, where to-be-measured vehicle speed control features indicated by the first lane area and the second lane area are different;

a feature determining unit, configured to determine the to-be-measured vehicle speed control features as target vehicle speed control features when a difference between a first empirical highest vehicle speed distribution and a second empirical highest vehicle speed distribution is greater than or equal to a preset difference threshold, where the first empirical highest vehicle speed distribution includes a plurality of empirical highest vehicle speeds of a plurality of vehicles in the operating process of the first lane area, and the second empirical highest vehicle speed distribution includes a plurality of empirical highest vehicle speeds of the plurality of vehicles in the operating process of the second lane area; and a sample determining unit, configured to take the starting coordinates and ending coordinates of each preset lane section in the map data, and the target vehicle speed control features and a vehicle speed control label in the preset lane section as a vehicle speed control model training sample, where the vehicle speed control label is a label of speed limit information obtained according to empirical speed statistics.

In a first possible implementation mode of the second aspect, the feature determining unit includes:

a generating module, configured to generate a speed limit histogram and a second speed limit histogram respectively according to empirical highest vehicle speeds corresponding to the first lane area and the second lane area; and a feature determining module, configured to determine the to-be-measured vehicle speed control features as target vehicle speed control features when a difference between the first empirical highest vehicle speed distribution represented by the first speed limit histogram and the second empirical highest vehicle speed distribution represented by the second speed limit histogram is greater than or equal to a preset difference threshold.

In a second possible implementation mode of the second aspect, the apparatus further includes:

a fitting unit, configured to, before the starting coordinates and ending coordinates of each preset lane section in the map data, and the target vehicle speed control features and a vehicle speed control label in the preset lane section are taken as a vehicle speed control model training sample, for each to-be-counted preset lane section, fit a plurality of empirical speeds on the to-be-counted preset lane section on the basis of a Gaussian mixture model to obtain empirical speeds of a plurality of speed grades, where the speed grades and the empirical speeds are in a positive correlation relationship; and a label determining unit, configured to take the average value of the empirical speeds of the highest speed grade as a target speed limit value of the to-be-counted preset lane section, and generate a vehicle speed control label containing the target speed limit value.

In a third possible implementation mode of the second aspect, the apparatus further includes:

a deleting unit, configured to, before the starting coordinates and ending coordinates of each preset lane section in the map data, and the target vehicle speed control features and a vehicle speed control label in the preset lane section are taken as a vehicle speed control model training sample, delete abnormal data in the plurality of empirical speeds corresponding to each preset lane section.

In a fourth possible implementation mode of the second aspect, the abnormal data include at least one of the following:

empirical speeds smaller than or equal to a preset speed threshold on a high-speed road section;

empirical speeds on a preset lane road section with an empirical speed number smaller than or equal to a preset number threshold; and empirical speeds on adjacent two road points with an empirical speed difference greater than or equal to a preset speed difference threshold.

In a fifth possible implementation mode of the second aspect, the apparatus further includes a scaling unit and/or a rotating unit;

the scaling unit is configured to, before the starting coordinates and ending coordinates of each preset lane section in the map data, and the target vehicle speed control features and a vehicle speed control label in the preset lane section are taken as a vehicle speed control model training sample, scale the first preset lane section and the vehicle speed control label corresponding to the first preset lane section in equal proportion;

the rotating unit is configured to rotate the second preset lane section; and the sample determining unit is configured to take starting coordinates and ending coordinates of the first preset lane section scaled by the scaling unit, the target vehicle speed control features corresponding to the scaled first preset lane section and the vehicle speed control label corresponding to the scaled first preset lane section as a vehicle speed control model training sample, and the first preset lane section is a preset lane section for scaling; and/or, take the starting coordinates and ending coordinates of the second preset lane section rotated by the rotating unit, the target vehicle speed control features corresponding to the rotated second preset lane section and a vehicle speed control label corresponding to the rotated second preset lane section as a vehicle speed control model training sample, and the second preset lane section is a preset lane section for rotating.

In a sixth possible implementation mode of the second aspect, the to-be-measured vehicle speed control features include at least one of the following:

road curvature, turning left at an intersection, turning right at an intersection, running straight at an intersection, a ramp, a merging lane and a diverging lane.

In a seven possible implementation mode of the second aspect, the dividing unit includes:

a first dividing module, configured to, when the to-be-measured vehicle speed control features include road curvature, divide the lane in the map data into a first lane area meeting a first road curvature range and a second lane area meeting a second road curvature range.

In an eighth possible implementation mode of the second aspect, the dividing unit further includes:

a fitting module, configured to, before the lane in the map data is divided into a first lane area meeting a first road curvature range and a second lane area meeting a second road curvature range, carry out curve fitting on coordinates of road points in the map data to obtain road curvature.

In a ninth possible implementation mode of the second aspect, the dividing unit includes:

a second dividing module, configured to, when the to-be-measured vehicle speed control features include any one of turning left at an intersection, turning right at an intersection, running straight at an intersection, a ramp, a merging lane and a diverging lane, divide the lane in map data into the first lane area with the to-be-measured vehicle speed control features and the second lane area without the to-be-measured vehicle speed control features.

In a third aspect, the embodiments of the present disclosure provide a storage medium, which stores a computer program thereon; and the program implements, when being executed by a processor, the method of any implementation mode of the first aspect.

In a fourth aspect, the embodiments of the present disclosure provide an electronic device, the electronic device includes:

one or more processors; and a storage device, configured to store one or more programs, where the one or more programs, when executed by the one or more processors, enable the electronic device to implement the method of any implementation mode of the first aspect.

In a fifth aspect, the embodiments of the present disclosure provide a vehicle, which includes the apparatus of any implementation mode of the second aspect, or includes the electronic device of the fourth aspect.

BRIEF DESCRIPTION OF DRAWINGS

In order to describe the technical solutions in the embodiments of the present disclosure or the relevant art more clearly, the drawings required to be used in descriptions about the embodiments of the present disclosure or the relevant art will be simply introduced below. Obviously, the drawings described below are only some embodiments of the present disclosure. For those of ordinary skills in the art, other attached drawings can also be obtained from these attached drawings without creative efforts.

DETAILED DESCRIPTION OF THE EMBODIMENTS

A clear and complete description on the technical solutions in the embodiments of the present disclosure will be given below, in combination with the accompanying drawings in the embodiments of the present disclosure. Obviously, the embodiments described herein are only some, but not all, embodiments of the present disclosure. All other embodiments obtained by those of ordinary skill in the art based on the embodiments of the present disclosure without creative efforts shall fall within the protection scope of the present disclosure.

It is to be noted that the embodiments and features in the embodiments of the present disclosure may be combined with each other without conflict. The terms "comprising" and "having" and any variations thereof in the embodiments and figures of the present disclosure are intended to cover a non-exclusive inclusion. For example, the process, method, system, product or equipment comprising a series of steps is not limited to the listed steps or units, but optionally further comprises unlisted steps or units, or optionally further comprises other steps of units inherent to the process, method, system, product or equipment.

Figure 1:
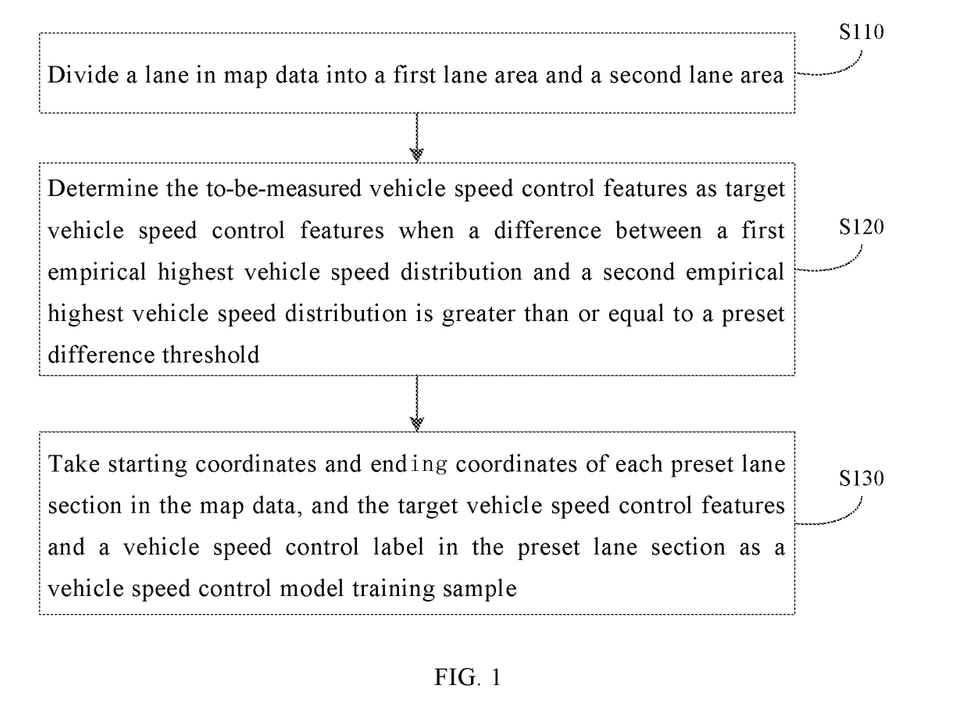
FIG. 1 is a schematic flow chart of a method for determining a vehicle speed control model training sample according to embodiments of the present disclosure.

FIG. 1 is a schematic flow chart of a method for determining a vehicle speed control model training sample, which may be applied to an electronic device or computer device, in particular to a vehicle or a server, and may include the following steps:

S110: a lane in map data is divided into a first lane area and a second lane area.

The to-be-measured vehicle speed control features indicated by the first lane area and the second lane area are different, which means that the features degrees of the same to-be-measured vehicle speed control feature contained in the first lane area and the second lane area are different. For example, if the first lane area includes a to-be-measured vehicle speed control feature 1, but the second lane area does not include to-be-measured the vehicle speed control feature 1, then the features degree of the to-be-measured vehicle speed control feature 1 contained in the first lane area is 100%, and that contained in the second lane area is 0. For another example, both the first lane area and the second lane area include a to-be-measured vehicle speed control feature 2, but the features values of the to-be-measured vehicle speed control feature 2 included in the first lane area and the second lane area are different, for example, the road curvatures are different.

The to-be-measured vehicle speed control features include at least one of the following: road curvature, turning left at an intersection, turning right at an intersection, running straight at an intersection, a ramp, a merging lane and a diverging lane.

When the to-be-measured vehicle speed control features include road curvature, S110 includes that: the lane in the map data is divided into a first lane area meeting a first road curvature range and a second lane area meeting a second road curvature range. The first road curvature range and the second road curvature range are not intersected, and the two road curvature ranges, when divided, can be divided into a low road curvature range and a high road curvature range respectively with a preset road curvature as a critical value, and the preset road curvature is an empirical value.

A specific calculation method of the road curvature includes that: curve fitting is carried out on coordinates of road points in the map data to obtain the road curvature. For example, curve fitting may be carried out on the coordinates of the road points in the map data to obtain a curve closest to the shape of the lane, and then the road curvature of each road point on the curve is calculated.

When the to-be-measured vehicle speed control features include any one of the turning left at an intersection, the turning right at an intersection, the running straight at an intersection, the ramp, the merging lane and the diverging lane, S110 includes that: the lane in the map data is divided into a first lane area with to-be-measured vehicle speed control features and a second lane area without to-be-measured vehicle speed control features. For example, the lane in the map data is divided into a lane area with the ramp and a lane area without the ramp.

S120: the to-be-measured vehicle speed control features are determined as target vehicle speed control features when a difference between a first empirical highest vehicle speed distribution and a second empirical highest vehicle speed distribution is greater than or equal to a preset difference threshold.

The first empirical highest vehicle speed distribution includes a plurality of empirical highest vehicle speeds of a plurality of vehicles in the operating process of the first lane area, and the second empirical highest vehicle speed distribution includes a plurality of empirical highest vehicle speeds of the plurality of vehicles in the operating process of the second lane area. The empirical highest vehicle speed refers to the highest speed per hour of the plurality of vehicles in the operating process of the same lane section.

For the same to-be-measured vehicle speed control feature, a plurality of lanes in map data can be divided into a first lane area and a second lane area, so that the first lane area includes at least one first lane sub-area, and the second lane area includes at least one second lane sub-area.

Exemplarily, when the to-be-measured vehicle speed control feature is the ramp, the plurality of lanes in the map data can be divided into a first lane area and a second lane area, so that the first lane area includes three first lane sub-areas, namely, a ramp 1, a ramp 2 and a ramp 3, and the second lane area includes three second lane sub-areas, namely, a non-ramp 1, a non-ramp 2 and a non-ramp 3. The empirical speeds of three vehicles in the operating process on the ramp 1 are respectively speed a1 of the vehicle 1, speed a2 of the vehicle 1, speed b1 of the vehicle 2, speed b2 of the vehicle 2 and speed cl of the vehicle 3, where the value of the speed b2 of the vehicle 2 is the highest in all the empirical speeds, so the speed b2 of the vehicle 2 is the highest empirical speed on the ramp 1; similarly, the ramp 2, the ramp 3, the non-ramp 1, the non-ramp 2 and the non-ramp 3 correspond to one empirical highest vehicle speed respectively, then the first empirical highest vehicle speed distribution can be determined according to a plurality of empirical highest vehicle speeds in the first lane area, and the second empirical highest vehicle speed distribution can be determined according to a plurality of empirical highest vehicle speeds in the second lane area.

In an implementation mode, the empirical highest vehicle speed distribution may be represented in the form of a histogram, or in the form of other profiles. When the empirical highest vehicle speed distribution is represented in the form of a histogram, the step includes that: a first highest vehicle speed histogram and a second highest vehicle speed histogram are generated respectively according to the empirical highest vehicle speeds corresponding to the first lane area and the second lane area; and the to-be-measured vehicle speed control features are determined as target vehicle speed control features when a difference between the first empirical highest speed distribution represented by the first highest vehicle speed histogram and the second empirical highest speed distribution represented by the second highest vehicle speed histogram is greater than or equal to a preset difference threshold.

When the difference between the first empirical highest vehicle speed distribution and the second empirical highest vehicle speed distribution is calculated, the distribution shape similarity between the first empirical highest vehicle speed distribution and the second empirical highest vehicle speed distribution can be calculated firstly, then a difference value between two different vertical coordinates corresponding to the same horizontal coordinate is calculated if the distribution shape similarity is greater than or equal to a preset similarity threshold, by comparing the mean square error of the difference values of all the vertical coordinates with a preset difference threshold, whether the to-be-measured vehicle speed control features are target vehicle speed control features or not is determined, and if the distribution shape similarity is smaller than the preset similarity threshold, that the difference between the first empirical highest vehicle speed distribution and the second empirical highest vehicle speed distribution is large is directly determined, and the to-be-measured vehicle speed control features are determined as the target vehicle speed control features.

The horizontal and vertical coordinates of the empirical highest vehicle speed distribution in different forms may be different. The histogram is short for a frequency histogram, and is a graph representing data by a series of rectangles of equal width and unequal height. The width of the rectangle represents the interval of the data range, and the height of the rectangle represents the data frequency in a given interval. Thus, when the empirical highest vehicle speed distribution adopts the histogram, the horizontal coordinates may include a plurality of vehicle speed ranges, and the vertical coordinates may include a vehicle speed frequency within a given vehicle speed range.

S130: the starting coordinates and ending coordinates of each preset lane section in the map data, and the target vehicle speed control features and a vehicle speed control label in the preset lane section are taken as a vehicle speed control model training sample.

The vehicle speed control label is a label of a target vehicle speed obtained according to empirical speed statistics, and the empirical speed is the actual running speed of the vehicle. The target vehicle speed control features in the preset lane section can be the target vehicle speed control features of each road point in the preset lane section, and the vehicle speed control label in the preset lane section can also be the vehicle speed control label of each road point in the preset lane section. When the target vehicle speed control features and the vehicle speed control labels of the whole preset lane section are the same, in order to save storage space, the target vehicle speed control features and the vehicle speed control labels of a plurality of road points in the preset lane section can be combined into one target vehicle speed control feature and vehicle speed control label.

In an implementation mode, the generation process of the vehicle speed control label may include that: for each to-be-counted preset lane section, the empirical highest vehicle speed of the to-be-counted preset lane section is taken as a target vehicle speed, and a vehicle speed control label containing the target vehicle speed is generated. However, the empirical highest vehicle speed is exemplary and not general, and if the empirical highest vehicle speed is directly taken as the target vehicle speed, the problem of traffic accidents caused by an excessively high vehicle speed may occur. Therefore, in order to enable the target vehicle speed predicted on the basis of the vehicle speed control model to further ensure the safety of traffic while improving the smoothness, the generation process of the vehicle speed control label may include that: for each to-be-counted preset lane section, a plurality of empirical speeds on the to-be-counted preset lane section are fitted on the basis of a Gaussian mixture model to obtain empirical speeds of a plurality of speed grades, and the speed grades and the empirical speeds are in a positive correlation relationship, that is, the higher the speed grades are, the higher the empirical speeds are; and the average value of the empirical speeds of the highest speed grade is taken as target vehicle speed of the to-be-counted preset lane section, and the vehicle speed control label containing the target vehicle speed is generated.

In addition, the vehicle speed control model training sample may further include at least one of the road type of the preset lane section, the number of lanes of the road to which the preset lane section belongs, and the lane ranking (namely, the ranking sequence of the lane) of the preset lane section. When the preset lane section includes traffic lights and/or obstacles, the vehicle speed control model training sample may further include traffic light labels and/or obstacle labels in the preset lane section. The road types include a highway and a common road. The obstacles include bus stops, sidewalks and the like.

After the vehicle speed control model training sample is obtained, the vehicle speed control model training sample can be trained to obtain a vehicle speed control model. In the subsequent operating process of the vehicle, the current position of the vehicle and the target vehicle speed control features corresponding to the current position can be input into the vehicle speed control model to predict the target vehicle speed, so that the vehicle can run on the basis of the target vehicle speed. The vehicle speed control model may be a VectorNet model or other models.

Compared with the related technology that the speed of the vehicle is adjusted according to the driving experience of a driver and/or the road conditions around the vehicle, in the embodiment of the present disclosure, the target vehicle speed control features influencing the speed of the vehicle can be firstly mined through the difference of the empirical highest vehicle speed distribution of the two lane areas divided on the basis of the to-be-measured vehicle speed control features, and then the starting coordinates and ending coordinates of each preset lane section in the map data, and the target vehicle speed control features and the vehicle speed control label in the preset lane section are taken as the vehicle speed control model training sample, so as to train a vehicle speed control model for controlling the speed of the vehicle on the basis of the vehicle speed control model training sample, thereby not only automatically determining the vehicle speed control model training sample, but also automatically providing the vehicle with the appropriate target vehicle speed on the basis of the vehicle speed control model generated by the vehicle speed control model training sample, therefore, the whole road network can run at an appropriate speed, and the smoothness of traffic is improved when the safety of traffic is ensured.

Figure 2:
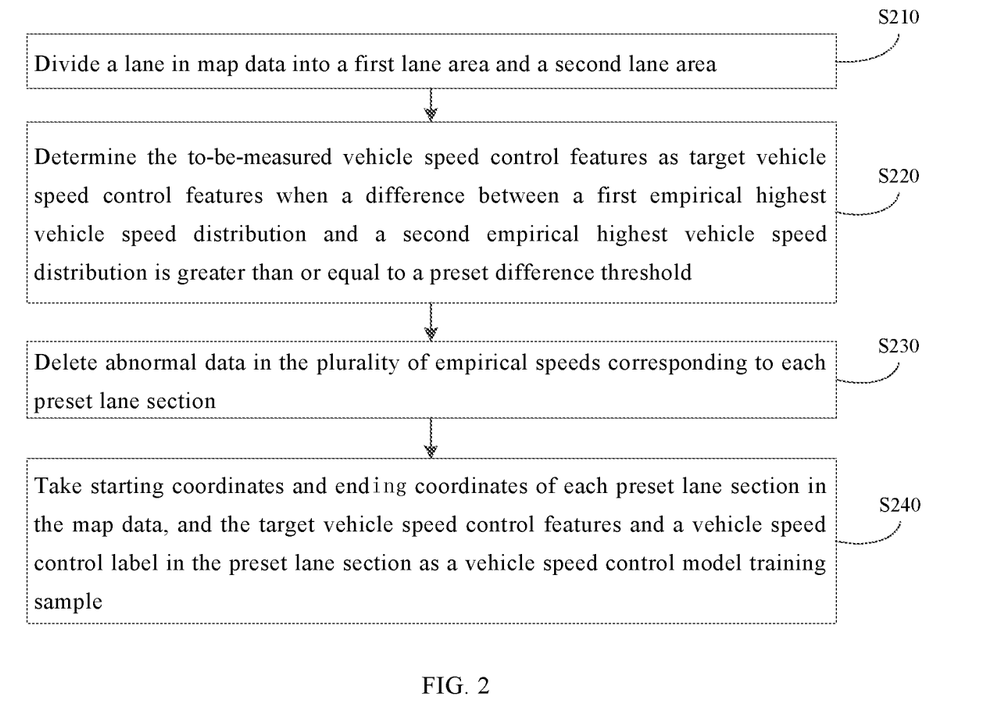
FIG. 2 is a schematic flow chart of another method for determining a vehicle speed control model training sample according to embodiments of the present disclosure.

On the basis of the above embodiment, another embodiment of the present disclosure provides a method for determining a vehicle speed control model training sample, as shown in FIG. 2. the method includes:

S210: a lane in map data is divided into a first lane area and a second lane area.

S220: the to-be-measured vehicle speed control features are determined as target vehicle speed control features when a difference between a first empirical highest vehicle speed distribution and a second empirical highest vehicle speed distribution is greater than or equal to a preset difference threshold.

S230: abnormal data in a plurality of empirical speeds corresponding to each preset lane section is deleted.

The abnormal data includes at least one of the following:

empirical speeds smaller than or equal to a preset speed threshold on a high-speed road section;

empirical speeds on a preset lane road section with an empirical speed number smaller than or equal to a preset number threshold; and empirical speeds on adjacent two road points with an empirical speed difference greater than or equal to a preset speed difference threshold.

The preset speed threshold, the preset number threshold and the preset speed difference threshold may be determined according to actual experience. For example, the preset speed threshold is 20 km/h, the preset number threshold is 20, and the preset speed difference threshold is 10 km/h.

It should be noted that the step where the abnormal data is deleted can be performed before the target vehicle speed control features are determined or after the target vehicle speed control features are determined, and the embodiment of the present disclosure will be introduced by taking the step that the abnormal data is deleted after the target vehicle speed control features are determined as an example.

S240: the starting coordinates and ending coordinates of each preset lane section in the map data, and the target vehicle speed control features and a vehicle speed control label in the preset lane section are taken as a vehicle speed control model training sample.

According to the method for determining a vehicle speed control model training sample provided by the embodiment of the present disclosure, the target vehicle speed control features influencing the speed of the vehicle can be automatically mined, and meanwhile, the vehicle speed control model is not interfered by abnormal data during training by deleting the abnormal empirical speeds, so that the prediction precision of the vehicle speed control model is improved.

Figure 3:
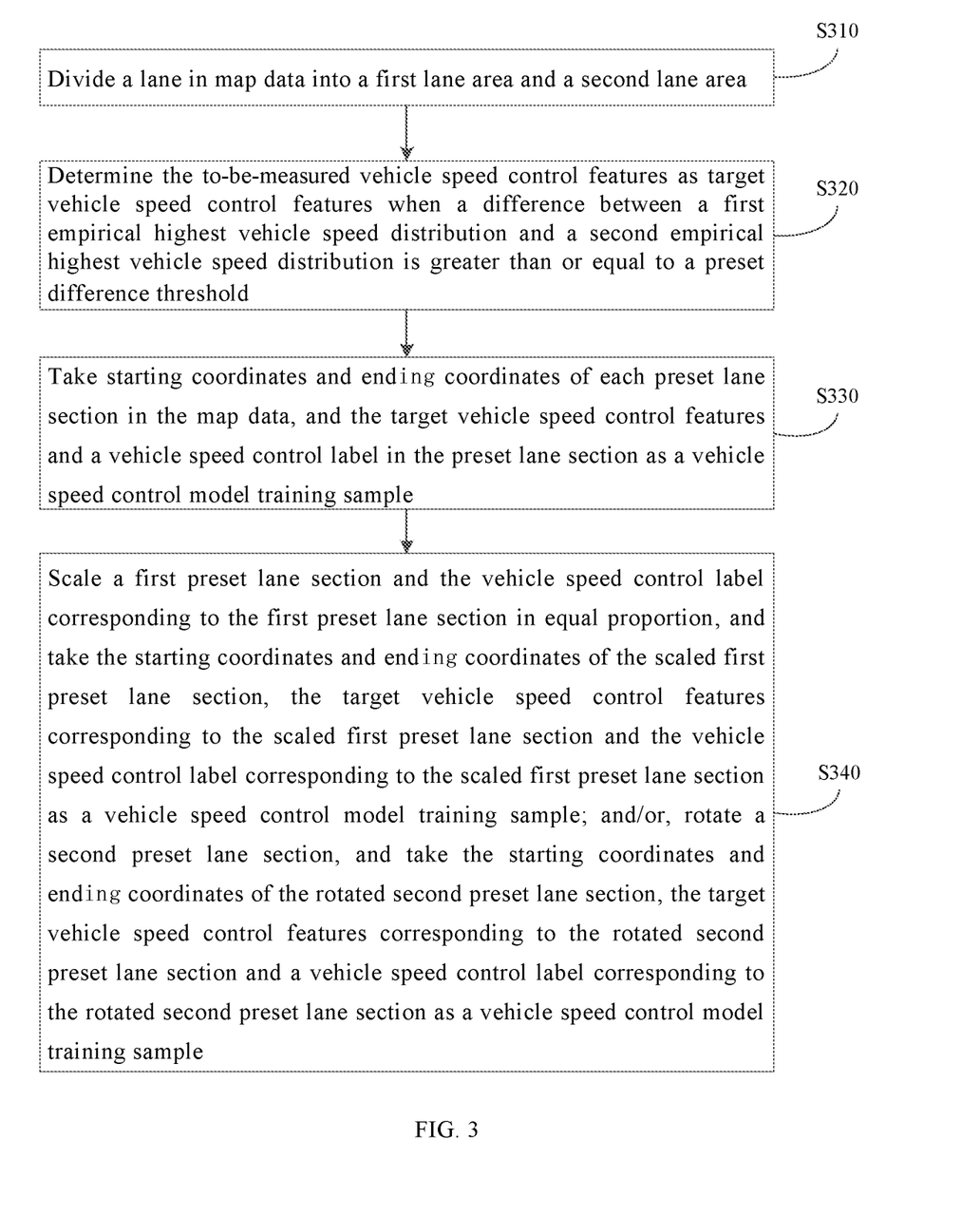
FIG. 3 is a schematic flow chart of still another method for determining a vehicle speed control model training sample according to embodiments of the present disclosure.

On the basis of the above embodiment, another embodiment of the present disclosure provides a method for determining a vehicle speed control model training sample, as shown in FIG. 3. the method includes:

S310: a lane in map data is divided into a first lane area and a second lane area.

S320: the to-be-measured vehicle speed control features are determined as target vehicle speed control features when a difference between a first empirical highest vehicle speed distribution and a second empirical highest vehicle speed distribution is greater than or equal to a preset difference threshold.

According to the embodiment of the present disclosure, before S320 is executed, or after S320 is executed and before S330 is executed, the abnormal data in the plurality of empirical speeds corresponding to each preset lane section can be deleted, so that the precision of the vehicle speed control model training sample is improved, and the prediction precision of the vehicle speed control model is improved.

S330: the starting coordinates and ending coordinates of each preset lane section in the map data, and the target vehicle speed control features and a vehicle speed control label in the preset lane section are taken as a vehicle speed control model training sample.

S340: a first preset lane section and the vehicle speed control label corresponding to the first preset lane section are scaled in equal proportion, the starting coordinates and ending coordinates of the scaled first preset lane section, the target vehicle speed control features corresponding to the scaled first preset lane section and a vehicle speed control label corresponding to the scaled first preset lane section are taken as a vehicle speed control model training sample; and/or, a second preset lane section is rotated, the starting coordinates and ending coordinates of the rotated second preset lane section, the target vehicle speed control features corresponding to the rotated second preset lane section and a vehicle speed control label corresponding to the rotated second preset lane section are taken as a vehicle speed control model training sample.

The first preset lane section is a preset lane section for scaling, and the second preset lane section is a preset lane section for rotating. The first preset lane section and the second preset lane section may be the same preset lane section and also may be different preset lane sections. The first preset lane section and the second preset lane section may be determined manually or according to a preset screening rule. For example, if the lane widths of the preset lane section in the used map data are differentiated in two stages, only wide or narrow preset lane sections exist, and the preset lane sections with the medium widths are lacked, the wide preset lane sections can be reduced, and the narrow preset lane section can be enlarged, so that a certain number of preset lane sections with the medium width are obtained. For another example, if the number of the preset lane sections bent leftwards in the used map data is far larger than that of the preset lane sections bent rightwards, part or all of the preset lane sections bent leftwards can be rotated to obtain a certain number of preset lane sections bent rightwards. For another example, if the number of the preset lane sections in the north-south direction in the used map data is large and the number of the preset lane sections in the east-west direction is small, the preset lane sections in the north-south direction can be rotated to obtain a certain number of preset lane sections in the east-west direction.

During scaling processing, on the basis of keeping the passing time unchanged, the first preset lane section and the target vehicle speed in the vehicle speed control label corresponding to the first preset lane section can be reduced or enlarged in equal proportion; and when rotation processing is performed, the second preset lane section can be directly rotated since rotation does not change the length and width of the preset lane section.

According to the method for determining a vehicle speed control model training sample provided by the embodiment of the present disclosure, by scaling and/or rotating the original vehicle speed control model training sample, the vehicle speed control model training sample with more scenes can be obtained by utilizing limited map data and driving experience information, therefore, the vehicle speed control model can learn training set data with better generalization ability, and further, the prediction precision of the vehicle speed control model is improved.

Figure 4:
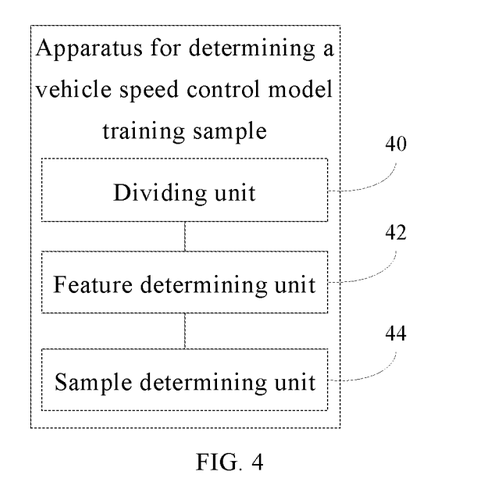
FIG. 4 is a block diagram of an apparatus for determining a vehicle speed control model training sample according to embodiments of the present disclosure.

In response to the above method embodiment, the embodiments of the present disclosure provide an apparatus for determining a vehicle speed control model training sample, as shown in FIG. 4. the apparatus includes:

a dividing unit 41, configured to divide a lane in map data into a first lane area and a second lane area, where to-be-measured vehicle speed control features indicated by the first lane area and the second lane area are different;

a feature determining unit 42, configured to determine the to-be-measured vehicle speed control features as target vehicle speed control features when a difference between a first empirical highest vehicle speed distribution and a second empirical highest vehicle speed distribution is greater than or equal to a preset difference threshold, where the first empirical highest vehicle speed distribution includes a plurality of empirical highest vehicle speeds of a plurality of vehicles in the operating process of the first lane area, and the second empirical highest vehicle speed distribution includes a plurality of empirical highest vehicle speeds of the plurality of vehicles in the operating process of the second lane area; and a sample determining unit 43, configured to take the starting coordinates and ending coordinates of each preset lane section in the map data, and the target vehicle speed control features and a vehicle speed control label in the preset lane section as a vehicle speed control model training sample, where the vehicle speed control label is a label of speed limit information obtained according to empirical speed statistics.

In an implementation mode, the feature determining unit 42 includes:

a generating module, configured to generate a speed limit histogram and a second speed limit histogram respectively according to empirical highest vehicle speeds corresponding to the first lane area and the second lane area; and a feature determining module, configured to determine the to-be-measured vehicle speed control features as target vehicle speed control features when a difference between the first empirical highest vehicle speed distribution represented by the first speed limit histogram and the second empirical highest vehicle speed distribution represented by the second speed limit histogram is greater than or equal to a preset difference threshold.

In an implementation mode, the apparatus further includes:

a fitting unit, configured to, before the starting coordinates and ending coordinates of each preset lane section in the map data, and the target vehicle speed control features and a vehicle speed control label in the preset lane section are taken as a vehicle speed control model training sample, for each to-be-counted preset lane section, fit a plurality of empirical speeds on the to-be-counted preset lane section on the basis of a Gaussian mixture model to obtain empirical speeds of a plurality of speed grades, where the speed grades and the empirical speeds are in a positive correlation relationship; and a label determining unit, configured to take the average value of the empirical speeds of the highest speed grade as a target speed limit value of the to-be-counted preset lane section, and generate a vehicle speed control label containing the target speed limit value.

In an implementation mode, the apparatus further includes:

a deleting unit, configured to, before the starting coordinates and ending coordinates of each preset lane section in the map data, and the target vehicle speed control features and a vehicle speed control label in the preset lane section are taken as a vehicle speed control model training sample, delete abnormal data in the plurality of empirical speeds corresponding to each preset lane section.

In an implementation mode, the abnormal data includes at least one of the following:

empirical speeds smaller than or equal to a preset speed threshold on a high-speed road section;

empirical speeds on a preset lane road section with an empirical speed number smaller than or equal to a preset number threshold; and empirical speeds on adjacent two road points with an empirical speed difference greater than or equal to a preset speed difference threshold.

In an implementation mode, the apparatus further includes a scaling unit and/or a rotating unit;

the scaling unit is configured to, before the starting coordinates and ending coordinates of each preset lane section in the map data, and the target vehicle speed control features and a vehicle speed control label in the preset lane section are taken as a vehicle speed control model training sample, scale the first preset lane section and the vehicle speed control label corresponding to the first preset lane section in equal proportion;

the rotating unit is configured to rotate the second preset lane section;

The sample determining unit 43 is configured to take starting coordinates and ending coordinates of the first preset lane section scaled by the scaling unit, the target vehicle speed control features corresponding to the scaled first preset lane section and the vehicle speed control label corresponding to the scaled first preset lane section as a vehicle speed control model training sample, and the first preset lane section is a preset lane section for scaling; and/or, take the starting coordinates and ending coordinates of the second preset lane section rotated by the rotating unit, the target vehicle speed control features corresponding to the rotated second preset lane section and a vehicle speed control label corresponding to the rotated second preset lane section as a vehicle speed control model training sample, and the second preset lane section is a preset lane section for rotating.

In an implementation mode, the to-be-measured vehicle speed control features include at least one of the following:

road curvature, turning left at an intersection, turning right at an intersection, running straight at an intersection, a ramp, a merging lane and a diverging lane.

In an implementation mode, the dividing unit 41 includes:

a first dividing module, configured to, when the to-be-measured vehicle speed control features include road curvature, divide the lane in the map data into a first lane area meeting a first road curvature range and a second lane area meeting a second road curvature range.

In an implementation mode, the dividing unit 41 further includes:

a fitting module, configured to, before the lane in the map data is divided into a first lane area meeting a first road curvature range and a second lane area meeting a second road curvature range, carry out curve fitting on coordinates of road points in the map data to obtain road curvature.

In an implementation mode, the dividing unit 41 includes:

a second dividing module, configured to, when the to-be-measured vehicle speed control features include any one of turning left at an intersection, turning right at an intersection, running straight at an intersection, a ramp, a merging lane and a diverging lane, divide the lane in map data into the first lane area with the to-be-measured vehicle speed control features and the second lane area without the to-be-measured vehicle speed control features.

Compared with the related technology that the speed of the vehicle is adjusted according to the driving experience of a driver and/or the road conditions around the vehicle, in the apparatus for determining a vehicle speed control model training sample provided by the embodiment of the present disclosure, the target vehicle speed control features influencing the speed of the vehicle can be firstly mined through the difference of the empirical highest vehicle speed distribution of the two lane areas divided on the basis of the to-be-measured vehicle speed control features, and then the starting coordinates and ending coordinates of each preset lane section in the map data, and the target vehicle speed control features and the vehicle speed control label in the preset lane section are taken as the vehicle speed control model training sample, so as to train a vehicle speed control model for controlling the speed of the vehicle on the basis of the vehicle speed control model training sample, thereby not only automatically determining the vehicle speed control model training sample, but also automatically providing the vehicle with the appropriate target vehicle speed on the basis of the vehicle speed control model generated by the vehicle speed control model training sample, therefore, the whole road network can run at an appropriate speed, and the smoothness of traffic is improved when the safety of traffic is ensured.

On the basis of the method embodiment, another embodiment of the present disclosure provides a storage medium, which stores an executable instruction thereon; and when executed by a processor, the instruction enables the processor to implement the method of any implementation mode.

On the basis of the method embodiment, another embodiment of the present disclosure provides an electronic device or computer device, which includes:

one or more processors; and a storage device, configured to store one or more programs, wherein The one or more programs, when executed by the one or more processors, enable the electronic device or computer device to implement the method of any implementation mode.

On the basis of the method embodiment, another embodiment of the present disclosure provides a vehicle, which includes the apparatus of any implementation mode, or includes the electronic device.

Figure 5:
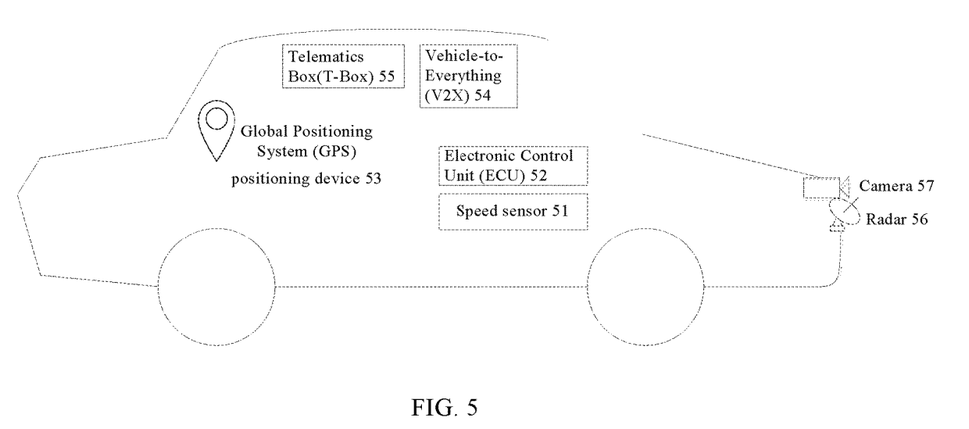
FIG. 5 is a schematic structure diagram of a vehicle according to embodiments of the present disclosure.

As shown in FIG. 5, the vehicle includes a speed sensor 51, an Electronic Control Unit (ECU) 52, a Global Positioning System (GPS) positioning device 53, a Vehicle-to-Everything (V2X) module 54, a TelematicsBox (T-Box) 55, a radar 56, and a camera 57. The speed sensor 51 is configured to measure the running speed of the vehicle; the GPS positioning device 53 is configured to acquire position information of the vehicle; and the ECU 52 is configured to determine a vehicle speed control model training sample by executing the method provided by the embodiment, and perform model training according to the vehicle speed control model training sample to obtain a vehicle speed control model. The position information of the vehicle obtained by the GPS positioning device 53 and the target vehicle speed control features corresponding to the vehicle position information in the map data are input into the vehicle speed control model to predict target vehicle speed, and the vehicle is controlled to run on the basis of the target vehicle speed. The ECU 52 may further report the position information of the vehicle obtained by the GPS positioning device 53 to the server through the T-Box 55, receive the target vehicle speed sent by the server through the T-Box 55, and control the vehicle to run on the basis of the target vehicle speed. The V2X module 54 is configured to communicate with other vehicles, roadside devices, and the like; the radar 56 or the camera 57 is configured to sense road environment information in the front and/or other directions, and the radar 56 and/or the camera 57 can be disposed on the front portion and/or the tail portion of the vehicle body; the T-Box 55 may serve as a wireless gateway, provide a remote communication interface for the whole vehicle through functions of 4G/5G and other remote wireless communication, GPS satellite positioning, acceleration sensing, CAN communication and the like, and provide services including driving data acquisition, running track recording, vehicle fault monitoring, vehicle remote query and control (unlocking and locking, air conditioner control, vehicle window control, engine torque limitation and engine starting and stopping), driving behavior analysis and the like.

The apparatus embodiment corresponds to the method embodiment and has the same technical effect as the method embodiment, and the detailed description can refer to the method embodiment. The apparatus embodiment is obtained on the basis of the method embodiment, and a detailed description can refer to the method embodiment and will not be repeated here. Those of ordinary skill in the art can understand that the figures are only schematic diagrams of one embodiment and the modules or flows in the figures are not necessarily required to practice the present disclosure.

Those of ordinary skills in the art should understand that the modules in the device of the embodiment may be distributed in the device of the embodiment as described in the embodiment, or may be correspondingly changed to be located in one or more devices different from the embodiment. The modules in the above embodiment may be combined into one module or may be further divided into multiple sub-modules.

Finally, it is to be noted that the above embodiments serve only to illustrate the technical solutions of the present disclosure and not to limit same; although the present disclosure has been described in detail with reference to embodiments, it is to be understood by those of ordinary skill in the art that the technical solutions described in the embodiments can still be modified, or part of the technical features can be equivalently replaced; and the modification or replacement does not make the essence of the corresponding technical solutions deviate from the spirit and scope of the technical solution of each embodiment of the present disclosure.

What is claimed is:

1. A method for determining a vehicle speed control model training sample, the method comprising:

dividing a lane in map data into a first lane area and a second lane area, wherein to-be-measured vehicle speed control features indicated by the first lane area and the second lane area are different;

determining the to-be-measured vehicle speed control features as target vehicle speed control feature when a difference between a first empirical highest vehicle speed distribution and a second empirical highest vehicle speed distribution is greater than or equal to a preset difference threshold, wherein the first empirical highest vehicle speed distribution comprises a plurality of empirical highest vehicle speeds of a plurality of vehicles in the operating process of the first lane area, and the second empirical highest vehicle speed distribution comprises a plurality of empirical highest vehicle speeds of the plurality of vehicles in the operating process of the second lane area; and taking starting coordinates and ending coordinates of each preset lane section in the map data, and the target vehicle speed control features and a vehicle speed control label in the preset lane section as a vehicle speed control model training sample, wherein the vehicle speed control label is a label of target vehicle speed obtained according to empirical speed statistics.

2. The method according to claim 1, wherein the determining the to-be-measured vehicle speed control features as target vehicle speed control feature when a difference between a first empirical highest vehicle speed distribution and a second empirical highest vehicle speed distribution is greater than or equal to a preset difference threshold comprises:

generating a first highest vehicle speed histogram and a second highest vehicle speed histogram respectively according to the empirical highest vehicle speeds corresponding to the first lane area and the second lane area; and determining the to-be-measured vehicle speed control features as the target vehicle speed control features when a difference between the first empirical highest speed distribution represented by the first highest vehicle speed histogram and the second empirical highest vehicle speed distribution represented by the second highest vehicle speed histogram is greater than or equal to the preset difference threshold.

3. The method according to claim 1, wherein before the taking starting coordinates and ending coordinates of each preset lane section in the map data, and the target vehicle speed control features and a vehicle speed control label in the preset lane section as a vehicle speed control model training sample, the method further comprises:

for each to-be-counted preset lane section, fitting a plurality of empirical speeds on the to-be-counted preset lane section on the basis of a Gaussian mixture model to obtain the empirical speeds of a plurality of speed grades, wherein the speed grades and the empirical speeds are in a positive correlation relationship; and taking the average value of the empirical speeds of the highest speed grade as a target vehicle speed of the to-be-counted preset lane section, and generating a vehicle speed control label containing the target vehicle speed.

4. The method according to claim 1, wherein before the taking starting coordinates and ending coordinates of each preset lane section in the map data, and the target vehicle speed control features and a vehicle speed control label in the preset lane section as a vehicle speed control model training sample, the method further comprises:

deleting abnormal data in the plurality of empirical speeds corresponding to each preset lane section.

5. The method according to claim 4, wherein the abnormal data comprises at least one of the following:

the empirical speeds smaller than or equal to a preset speed threshold on a high-speed road section;

the empirical speeds on the preset lane section with an empirical speed number smaller than or equal to a preset number threshold; and the empirical speeds on adjacent two road points with empirical speed difference greater than or equal to a preset speed difference threshold.

6. The method according to claim 1, wherein after the taking starting coordinates and ending coordinates of each preset lane section in the map data, and the target vehicle speed control features and a vehicle speed control label in the preset lane section as a vehicle speed control model training sample, the method further comprises at least one of the following:

scaling a first preset lane section and a vehicle speed control label corresponding to the first preset lane section in equal proportion, and taking starting coordinates and ending coordinates of the scaled first preset lane section, the target vehicle speed control features corresponding to the scaled first preset lane section and the vehicle speed control label corresponding to the scaled first preset lane section as the vehicle speed control model training sample, wherein the first preset lane section is the preset lane section for scaling; or, rotating a second preset lane section, and taking starting coordinates and ending coordinates of the rotated second preset lane section, the target vehicle speed control features corresponding to the rotated second preset lane section and the vehicle speed control label corresponding to the rotated second preset lane section as the vehicle speed control model training sample, wherein the second preset lane section is the preset lane section for rotating.

7. The method according to claim 1, wherein the to-be-measured vehicle speed control features comprise at least one of the following:

road curvature, turning left at an intersection, turning right at an intersection, running straight at an intersection, a ramp, a merging lane and a diverging lane.

8. The method according to claim 7, wherein when the to-be-measured vehicle speed control features comprise the road curvature, the dividing a lane in map data into a first lane area and a second lane area comprises:

dividing the lane in the map data into the first lane area meeting a first road curvature range and the second lane area meeting a second road curvature range.

9. The method according to claim 8, wherein before the dividing the lane in the map data into the first lane area meeting a first road curvature range and the second lane area meeting a second road curvature range, the method further comprises:

carrying out curve fitting on coordinates of road points in the map data to obtain the road curvature.

10. The method according to claim 7, wherein when the to-be-measured vehicle speed control features comprise at least one of the turning left at an intersection, the turning right at an intersection, the running straight at an intersection, the ramp, the merging lane and the diverging lane, the dividing a lane in the map data into a first lane area and a second lane area comprises:

dividing the lane in the map data into the first lane area with the to-be-measured vehicle speed control features and a second lane area without the to-be-measured vehicle speed control features.

11. An apparatus for determining a vehicle speed control model training sample, the apparatus comprising:

one or more processors, and a non-transitory storage medium in communication with the one or more processors, the non-transitory storage medium configured to store program instructions, wherein, when executed by the one or more processors, the instructions cause the apparatus to perform:
dividing a lane in map data into a first lane area and a second lane area, wherein to-be-measured vehicle speed control features indicated by the first lane area and the second lane area are different;
determining the to-be-measured vehicle speed control features as target vehicle speed control features when a difference between a first empirical highest vehicle speed distribution and a second empirical highest vehicle speed distribution is greater than or equal to a preset difference threshold, wherein the first empirical highest vehicle speed distribution comprises a plurality of empirical highest vehicle speeds of a plurality of vehicles in the operating process of the first lane area, and the second empirical highest vehicle speed distribution comprises a plurality of empirical highest vehicle speeds of the plurality of vehicles in the operating process of the second lane area; and
taking starting coordinates and ending coordinates of each preset lane section in the map data, and the target vehicle speed control features and a vehicle speed control label in the preset lane section as a vehicle speed control model training sample, wherein the vehicle speed control label is a label of speed limit information obtained according to empirical speed statistics.

12. The apparatus according to claim 11, wherein the determining the to-be-measured vehicle speed control features as target vehicle speed control feature when a difference between a first empirical highest vehicle speed distribution and a second empirical highest vehicle speed distribution is greater than or equal to a preset difference threshold comprises:
generating a first speed limit histogram and a second speed limit histogram respectively according to the empirical highest vehicle speeds corresponding to the first lane area and the second lane area; and
determining the to-be-measured vehicle speed control features as the target vehicle speed control features when a difference between the first empirical highest vehicle speed distribution represented by the first speed limit histogram and the second empirical highest vehicle speed distribution represented by the second speed limit histogram is greater than or equal to the preset difference threshold.

13. The apparatus according to claim 11, wherein the apparatus further performs:
before the taking the starting coordinates and ending coordinates of each preset lane section in the map data, and the target vehicle speed control features and a vehicle speed control label in the preset lane section as a vehicle speed control model training sample, for each to-be-counted preset lane section, fitting a plurality of empirical speeds on the to-be-counted preset lane section on the basis of a Gaussian mixture model to obtain the empirical speeds of a plurality of speed grades, wherein the speed grades and the empirical speeds are in a positive correlation relationship; and
taking the average value of the empirical speeds of the highest speed grade as a target speed limit value of the to-be-counted preset lane section, and generating a vehicle speed control label containing the target speed limit value.

14. The apparatus according to claim 11, wherein the apparatus further performs:
before the taking the starting coordinates and ending coordinates of each preset lane section in the map data, and the target vehicle speed control features and a vehicle speed control label in the preset lane section as a vehicle speed control model training sample, deleting abnormal data in the plurality of empirical speeds corresponding to each preset lane section.

15. The apparatus according to claim 11, wherein the apparatus further performs;
after the taking the starting coordinates and ending coordinates of each preset lane section in the map data, and the target vehicle speed control features and a vehicle speed control label in the preset lane section as a vehicle speed control model training sample, scaling a first preset lane section and a vehicle speed control label corresponding to the first preset lane section in equal proportion;
rotating a second preset lane section;
taking starting coordinates and ending coordinates of the first preset lane section scaled, the target vehicle speed control features corresponding to the scaled first preset lane section and the vehicle speed control label corresponding to the scaled first preset lane section as the vehicle speed control model training sample, wherein the first preset lane section is a preset lane section for scaling; or, taking starting coordinates and ending coordinates of the second preset lane section rotated, the target vehicle speed control features corresponding to the rotated second preset lane section and the vehicle speed control label corresponding to the rotated second preset lane section as the vehicle speed control model training sample, wherein the second preset lane section is a preset lane section for rotating.

16. The apparatus according to claim 11, wherein the to-be-measured vehicle speed control features comprise at least one of the following:
road curvature, turning left at an intersection, turning right at an intersection, running straight at an intersection, a ramp, a merging lane and a diverging lane.

17. The apparatus according to claim 16, wherein the apparatus further performs:
when the to-be-measured vehicle speed control features comprise the road curvature, dividing the lane in the map data into the first lane area meeting a first road curvature range and the second lane area meeting a second road curvature range.

18. The apparatus according to claim 17, wherein the apparatus further performs:
before the dividing the lane in the map data into the first lane area meeting a first road curvature range and the second lane area meeting a second road curvature range, carrying out curve fitting on coordinates of road points in the map data to obtain the road curvature.

19. The apparatus according to claim 16, wherein the apparatus further performs:
when the to-be-measured vehicle speed control features comprise any one of the turning left at an intersection, the turning right at an intersection, the running straight at an intersection, the ramp, the merging lane and the diverging lane, dividing the lane in the map data into the first lane area with to-be-measured vehicle speed control features and the second lane area without the to-be-measured vehicle speed control features.

20. A vehicle, comprising the apparatus according to claim 11.

\* \* \* \* \*